US012358353B2

(12) United States Patent
Bramauer et al.

(10) Patent No.: US 12,358,353 B2
(45) Date of Patent: Jul. 15, 2025

(54) PROTECTION DEVICE FOR A DOOR LEAF OF A MOTOR VEHICLE

(71) Applicant: KNORR-BREMSE GESELLSCHAFT MIT BESCHRÄNKTER HAFTUNG, Mödling (AT)

(72) Inventors: Johann Bramauer, Ybbsitz (AT); Thomas Hirtenlehner, Wolfsbach (AT); Helmut Schaffer, Ungenach (AT); Peter Jetzinger, Enns (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 737 days.

(21) Appl. No.: 17/274,424

(22) PCT Filed: Sep. 5, 2019

(86) PCT No.: PCT/EP2019/073682
§ 371 (c)(1),
(2) Date: Mar. 8, 2021

(87) PCT Pub. No.: WO2020/049092
PCT Pub. Date: Mar. 12, 2020

(65) Prior Publication Data
US 2022/0048372 A1 Feb. 17, 2022

(30) Foreign Application Priority Data
Sep. 7, 2018 (DE) .................... 10 2018 121 924.5

(51) Int. Cl.
*B60J 10/40* (2016.01)
*B60J 10/86* (2016.01)

(52) U.S. Cl.
CPC .............. *B60J 10/40* (2016.02); *B60J 10/86* (2016.02)

(58) Field of Classification Search
CPC .................................. B60J 10/40; B60J 10/86
See application file for complete search history.

(56) References Cited

U.S. PATENT DOCUMENTS

| 4,349,710 A | * | 9/1982 | Miller | H01H 3/142 |
| | | | | 200/61.43 |
| 5,808,228 A | | 9/1998 | Beschle et al. | |

(Continued)

FOREIGN PATENT DOCUMENTS

| CH | 688 354 | * | 6/1997 |
| CN | 1213736 A | | 4/1999 |

(Continued)

OTHER PUBLICATIONS

International Search Report corresponding to PCT/EP2019/073682, dated Dec. 11, 2019.

*Primary Examiner* — Gregory J Strimbu
(74) *Attorney, Agent, or Firm* — Barnes & Thornburg LLP

(57) ABSTRACT

A protection device for a door leaf for a motor vehicle includes a main body, a follower portion and a suspension element. The main body has a fastening side for fastening the main body to the door leaf and a sealing side opposite the fastening side. Furthermore, the main body comprises a first outer portion and a second outer portion. The first outer portion and the second outer portion run between the sealing side and the fastening side. The follower portion is arranged on the sealing side. The suspension element movably connects the follower portion to the main body and is designed to cause an evasive movement of the follower portion away from the fastening side in response to an application of force to the first outer portion.

9 Claims, 5 Drawing Sheets

(56) References Cited

U.S. PATENT DOCUMENTS

| | | | | |
|---|---|---|---|---|
| 6,125,591 | A * | 10/2000 | Schmidhuber | B60J 10/40 49/477.1 |
| 7,603,813 | B2 * | 10/2009 | Hackl | E05F 15/42 49/27 |
| 9,849,767 | B2 * | 12/2017 | Salles | B60J 10/40 |
| 10,569,627 | B2 | 2/2020 | Baba et al. | |
| 11,549,301 | B2 * | 1/2023 | Kawase | H01H 3/142 |
| 2009/0026709 | A1 * | 1/2009 | Katzensteiner | B60J 10/40 277/321 |
| 2016/0144699 | A1 | 5/2016 | Salles et al. | |
| 2020/0291709 | A1 * | 9/2020 | Hirtenlehner | B60J 5/062 |
| 2022/0048372 | A1 * | 2/2022 | Bramauer | B60J 10/40 |

FOREIGN PATENT DOCUMENTS

| | | | |
|---|---|---|---|
| CN | 202242903 U | | 5/2012 |
| CN | 206812769 U | | 12/2017 |
| CN | 207173255 U | | 4/2018 |
| CN | 207565293 U | | 7/2018 |
| DE | 9406445 U1 | | 6/1994 |
| DE | 102005060604 B3 | | 4/2007 |
| DE | 202010004322 U1 | | 7/2011 |
| DE | 112014001393 T5 | | 12/2015 |
| EP | 818665 A1 | | 1/1998 |
| EP | 2532820 A3 | | 4/2015 |
| EP | 3112571 A1 | | 1/2017 |
| FR | 3 008 035 | * | 1/2015 |
| GB | 2581423 | * | 12/2019 |
| KR | 10-2012-0011227 | * | 2/2012 |
| WO | WO 2018/219694 | * | 6/2018 |
| WO | WO 2019/234332 | * | 12/2019 |

\* cited by examiner

PROTECTION DEVICE FOR A DOOR LEAF OF A MOTOR VEHICLE

CROSS REFERENCE AND PRIORITY

This patent application is a U.S. National Phase of International Patent Application No. PCT/EP2019/073682 filed Sep. 5, 2019, which claims priority to German Patent Application No. 10 2018 121 924.5, the disclosure of which being incorporated herein by reference in their entireties.

FIELD

Disclosed embodiments relate to a protection device for a door leaf for a vehicle and to a door device for a vehicle.

BACKGROUND

A protection device, for example an anti-entrapment rubber, may be arranged on a door of a vehicle. The protection device may comprise a detection system for identifying a foreign body entrapped between two door leaves or between a door and a vehicle portal.

SUMMARY

Against this background, the disclosed embodiments provide an improved protection device for a door leaf for a vehicle and an improved door device for a vehicle.

BRIEF DESCRIPTION OF THE FIGURES

Exemplary embodiments of the approach set forth herein are described in more detail in the following description with reference to the figures, in which.

DETAILED DESCRIPTION

Figure 1:
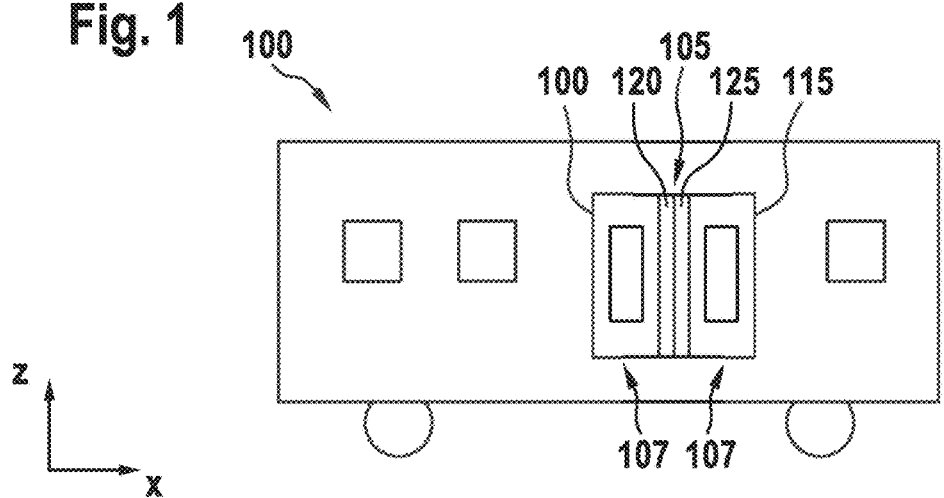
FIG. 1 shows a schematic view of a vehicle with a door device according to an exemplary embodiment.

Disclosed embodiments provide an improved protection device for a door leaf for a vehicle and an improved door device for a vehicle.

More specifically, a protection device for a door leaf for a vehicle has a main body, a follower portion and a suspension element. The main body has a sealing side and a fastening side opposite the sealing side for fastening the main body to the door leaf. Additionally, the main body comprises a first outer portion and a second outer portion. The first outer portion and the second outer portion run between the sealing side and the fastening side. The follower portion is arranged on the sealing side. The suspension element movably connects the follower portion to the main body and is designed to cause an evasive movement of the follower portion away from the fastening side in response to an application of force to the first outer side.

The protection device may be arranged as an anti-entrapment device on a closing edge of the door leaf. Should a foreign body be entrapped during a closing process of the door leaf, the foreign body may cause a switching movement of the follower portion in the direction of the fastening side of the protection device. Advantageously, the direction of the switching movement may be opposed to the direction of the evasive movement. In this manner, the type of force causing the movement may be deduced from a movement of the follower portion. It is thus advantageously possible to differentiate between an application of force acting on the first outer side of the protection device and an application of force produced by an entrapped foreign body.

The vehicle may be, for example, a vehicle for passenger conveyance. In particular, the vehicle may be designed as a rail vehicle. The door of the vehicle may be implemented, for example, as a door system with two door leaves or as a single-leaf door system. The protection device may be designed in one piece or in multiple pieces. The main body, the follower portion and the suspension element may be formed, for example, from an elastomer. The protection device may also be denoted as a finger protection rubber. The protection device may comprise a switching device for detecting an entrapped foreign body. Advantageously, due to the direction of the evasive movement it is possible to prevent the switching device from incorrectly detecting an entrapped foreign body in the case of the application of force on the first outer side. In the mounted state of the protection device, the outer side of the first outer portion may be arranged on an outer side of the vehicle and the outer side of the second outer portion may be arranged on an inner side of the vehicle. In the mounted state of the protection device the follower portion may run in the direction of an x-axis of the protection device. In this case the x-axis may correspond to a longitudinal axis of the vehicle. The suspension element may be of flexible design. Additionally, the suspension element may be configured to permit a movement of the follower portion along an x-axis and in the direction of a y-axis, wherein the y-axis may correspond to a transverse axis of the vehicle. The application of force on the first outer side may be a foreign body which presses against the protection device and which is pressed, for example, from outside or inside the vehicle against the protection device. The suspension element may be designed to be elastically deformable in order to effect the evasive movement.

According to one embodiment, the suspension element may be designed to deflect a compressive force caused by the application of force into a movement force acting in the direction of extension of the follower portion in order to move the follower portion. The application of force may be oriented, for example, in the direction of a y-axis and thus it may act on the protection device, for example, at right angles to the follower portion. Advantageously, by the deflection of the compressive force into the movement force it is possible to effect the evasive movement of the follower portion mechanically without further deflection elements, which is able to be implemented cost-effectively.

Moreover, according to one embodiment the first outer portion and the suspension element may be deformable in response to the application of force. In this case, the first outer portion may be moved in the direction of the second outer portion and the suspension element may be compressed in order to cause the evasive movement of the follower portion. The deformability of the first outer portion and the suspension element is advantageous in order to to prevent damage to the suspension element by the application of force and to permit the evasive movement.

According to one embodiment, the suspension element may have a first web which is designed to connect the follower portion to the first outer portion. Moreover, the suspension element may have a second web which is designed to connect the follower portion to the second outer portion. The first web may be directly connected, for example, to the first outer portion and the second web may also be directly connected to the second outer portion or connected, for example, to a main body portion which is connected to the second outer portion. The design of the suspension element with the first web and the second web advantageously permits a stable fastening of the follower portion to the main body and at the same time the mobility of the follower portion relative to the main body in a compact design.

According to one embodiment, the first web and additionally or alternatively the second web may have a curvature. In this case an end of the first web, and additionally or alternatively of the second web, connected to the follower portion may be further removed from the fastening side than an end connected to the main body. The curvature of the first web, and additionally or alternatively of the second web, permits the evasive movement of the follower portion away from the fastening side by means of a space-saving suspension element.

According to one embodiment, a cavity which is spanned by the follower portion and the suspension element may be designed in the main body. A spacing between the follower portion and a rear wall of the cavity opposite the follower portion may be increased by the evasive movement of the follower portion by the application of force. The cavity is advantageous in order to implement a mobility of the follower portion relative to the main body in various directions by means of the suspension element. Additionally, the cavity may be used in order to detect a movement of the follower portion by using a switching device. In this case at least one element of the switching device may be arranged inside the cavity on an edge of the cavity or in a wall of the cavity or of the follower portion.

According to one embodiment, the suspension element may also be designed to cause a switching movement of the follower portion in the direction of the fastening side of the cavity in response to an external force acting on a free end of the follower portion. The external force acting on the free end of the follower portion may be, for example, a foreign body pressing against the free end. If in the mounted state of the protection device a foreign body is entrapped between the protection device and a counter body, for example a further door leaf with or without a protection device, the switching movement of the follower portion may be caused by the external force by means of the suspension element. The switching movement may be identified by an optional switching device, in order to be able to detect the entrapped foreign body. Advantageously, therefore, both the evasive movement and the switching movement may be implemented by means of the suspension element.

According to one embodiment, the protection device may comprise a switching device. The switching device may be configured in order to detect electrically or optically the switching movement of the follower portion, for example. According to one embodiment, the switching device may have a first switching element connected to the follower portion and a second switching element connected to the main body. The first switching element and the second switching element may be brought into contact by the switching movement, in order to detect a foreign body acting on the free end of the follower portion. It is thus advantageously possible to use the suspension element of the follower portion and thus the protection device both for detecting an entrapped foreign body and for avoiding an undesired triggering of the detection by the application of force from outside on the protection device, in order to permit as far as possible a trouble-free operation of the vehicle.

According to one embodiment, the main body may also have at least one sealing portion for sealing the door leaf. The at least one sealing portion may be designed on the sealing side as an extension of the first outer portion or of the second outer portion. The protection device may also have two sealing portions, wherein one of the sealing portions is designed as an extension of the first outer portion and the other sealing portion is designed as an extension of the second outer portion. The sealing portion may also be designed to be deformable in response to the action of force. In a relaxed state of the protection device, the sealing portion may protrude relative to the follower portion. The at least one sealing portion may be configured to seal the door leaf when pressed against a counter body. Additionally, the sealing portion may also be designed to prevent a penetration of a foreign body between the protection device and the counter body.

Moreover, according to one embodiment the sealing portion may be designed as a hollow and compressible sealing element. Alternatively, the sealing portion may also be designed as a solid impact element with a sealing surface. The sealing portion may also be designed as a sealing lip. If the counter body is designed, for example, as a further protection device, in each case a sealing surface may be arranged opposite a sealing element. The sealing lip may be arranged, for example, opposite the sealing surface.

This approach also proposes a door device for a vehicle. The door device has a door leaf and an embodiment of the aforementioned protection device which is connected to a closing edge of the door leaf. The door device may be a single-leaf or multi-leaf door for a vehicle or a trailer car of a vehicle, for example a car of a rail vehicle.

According to one embodiment, the door device may also comprise a further door leaf and a further protection device, as mentioned above, which is connected to a closing edge of the further door leaf. In a closing process for closing the door leaf, the door device may be designed to press against the further door leaf, and in this case the protection device and the further protection device are able to seal the door leaf and the further door leaf relative to one another. The door leaf and the further door leaf may have embodiments of the protection device which are designed to be different or identical.

According to one embodiment, the door device may also comprise a further door leaf and a counter body which is connected to a closing edge of the further door leaf. As in the case of the aforementioned protection device, the counter body may be arranged as an anti-entrapment device on a closing edge of the further door leaf but may be designed differently from the aforementioned protection device. The counter body may have a counter body sealing side which faces the protection device and a counter body fastening side for fastening the counter body to the further door leaf. Additionally, the counter body may comprise a first counter body outer portion and a second counter body outer portion. The first counter body outer portion and the second counter body outer portion may run between the counter body sealing side and the counter body fastening side. An anti-penetration portion may be arranged between the first counter body outer portion and the second counter body outer portion. The anti-penetration portion may be designed to fill partially an intermediate space between the follower portion and the second outer portion of the protection device when the protection device and the counter body are brought together. In a closing process for closing the door leaf, the door device may be designed to press against the further door leaf and at the same time the protection device and the counter body may seal the door leaf and the further door leaf relative to one another. The anti-penetration portion may be configured to prevent or impede a penetration of a foreign body between the protection device and the counter body from outside, i.e. from outside or inside the vehicle. As a result, advantageously an entrapment of a foreign body may be prevented or impeded after a closing process has taken place, which is advantageous relative to a trouble-free operation of the vehicle with the door device.

According to one embodiment, in the closed state of the door device a first spacing between the first outer portion and the first counter body outer portion may be greater than a second spacing between the second outer portion and the second counter body outer portion. This advantageously permits a narrow foreign body, such as for example an item of clothing, to be entrapped on an inner side of the door device between the protection device and the counter body, for example between the second outer portion and the second counter body outer portion, so that when an attempt is made to pull out the foreign body via the second outer portion a triggering of an optional drag detection device is avoided. If an attempt were to be made to pull out the foreign body via the first outer portion, however, the drag detection device would be triggered.

In the following description of advantageous exemplary embodiments of the present approach, the same or similar reference numerals are used for similar acting elements shown in the various figures, wherein a repeated description of these elements is omitted.

FIG. 1 shows a schematic view of a vehicle 100 with a door device 105 according to an exemplary embodiment. A passenger trailer car of a rail vehicle is shown by way of example as the vehicle 100. The door device 105 is designed here by way of example as a double-leaf door 107 and has a door leaf 110 and a further door leaf 115. Alternatively, the door device 105 may also be designed as a single-leaf door and may have only the door leaf 110 which is designed for closing a vehicle portal.

According to the exemplary embodiment shown, a protection device 120 is arranged on a closing edge of the door leaf 110. Accordingly, the further door leaf 115 has a counter body 125 connected to a closing edge of the further door leaf 115. The counter body 125 may be designed so as to correspond to the protection device 120 or differently from the protection device 120. In the closed state shown of the door device 105, the sealing sides of the protection device 120 and the counter body 125 are in contact with one another.

The x-axis shown corresponds to a longitudinal axis of the vehicle 100 and the z-axis corresponds to a vertical axis of the vehicle 100.

Figure 2:
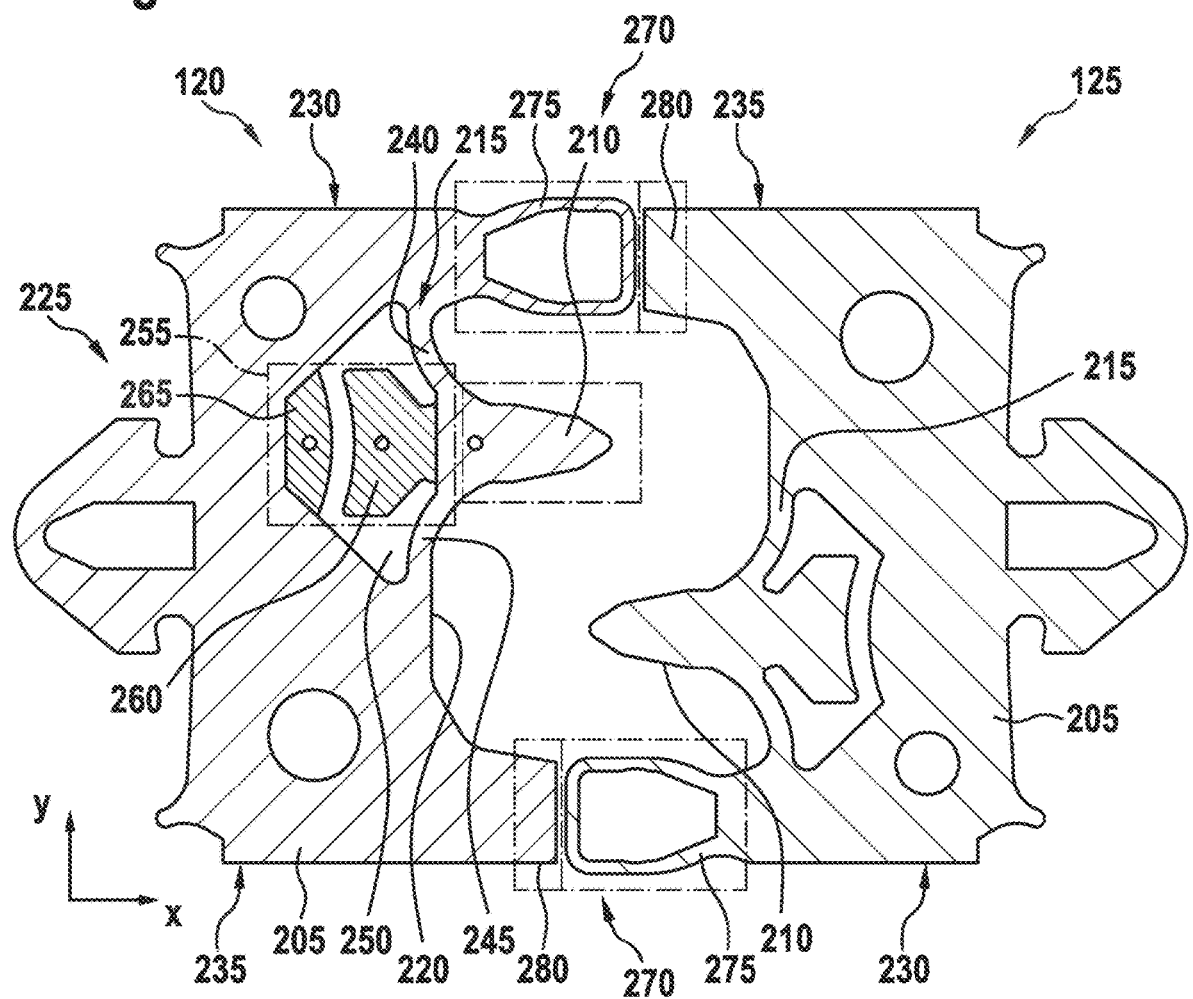
FIG. 2 shows a schematic view of a protection device and a counter body according to an exemplary embodiment.

FIG. 2 shows a schematic view of a protection device 120 and of a counter body 125 according to an exemplary embodiment. The counter body 125 is designed in this case as a further protection device. The protection device 120 shown here and the counter body shown here are able to be connected to a door device as described with reference to FIG. 1 and are able to be used as finger protection rubbers for the vehicle. A cross section of the protection device 120 and of the counter body 125 is shown in a non-closed state.

The protection device 120 comprises a main body 205, a follower portion 210 and a suspension element 215. The main body 205 has a sealing side 220 and a fastening side 225 for fastening the main body 205 to the door leaf. The sealing side 220 is arranged opposite the fastening side 225. The sealing side 220 faces the counter body 125 in the mounted state of the protection device 120. Additionally the main body 205 comprises a first outer portion 230 and a second outer portion 235. The first outer portion 230 and the second outer portion 235 run between the sealing side 220 and the fastening side 225. The outer portions 230, 235 form lateral outer walls of the protection device 120. The follower portion 210 is arranged on the sealing side 220. The suspension element 215 movably connects the follower portion 210 to the main body 205. Additionally, the suspension element 215 is designed to cause an evasive movement of the follower portion 210 away from the fastening side 225 in response to an application of force to the first outer side 230.

The follower portion 210 runs along an x-axis of the protection device 120 and is movable by means of the suspension element 215 along the x-axis and in the direction of a y-axis. In this case, by way of example the follower portion 210 has an acutely running tapered portion at a free end.

In this case, the main body 205 with the follower portion 210 and the suspension element 215 are designed in one piece and formed from an elastomer. The follower portion 210 is arranged eccentrically relative to the y-axis, in this case on the half of the main body 205 which is closer to the first outer portion 230 than the second outer portion 235.

A fastening tab is formed on the fastening side 225 for fastening the protection device 120 to the door leaf. The fastening tab and the follower portion 210 are arranged offset to one another relative to the y-axis.

In the main body 205 a round recess is optionally designed adjacent to the first outer portion 230 and a further round recess is designed adjacent to the second outer portion 235, with a diameter which is approximately one and a half times as large as the diameter of the recess on the first outer portion 230.

According to the exemplary embodiment shown here, the suspension element 215 has a first web 240 which is designed to connect the follower portion 210 to the first outer portion 230. Additionally, the suspension element 215 has a second web 245 which is designed to connect the follower portion 210 to the second outer portion 235. The first web 240 connects the follower portion 210 on the sealing side 220 to the first outer portion 230. According to this exemplary embodiment, the webs 240, 245 have the same length. The second web 245 twists the follower portion 210 with a main body portion adjoining the second outer portion 235.

Moreover, according to the exemplary embodiment shown here, the first web 240 and the second web 245 have a curvature. In this case, an end of the first web 240 which is connected to the follower portion 210 is further removed from the fastening side 225 than an end connected to the main body 205. Furthermore, an end of the second web 245 which is connected to the follower portion 210 is further removed from the fastening side 225 than an end which is connected to the main body 205. As an alternative to the exemplary embodiment shown here, just one of the webs 240, 245 may have the curvature. The curvature is designed in this case in an arcuate manner.

According to the exemplary embodiment shown here, a cavity 250 is designed in the main body 205. The cavity 250 is spanned by the follower portion 210 and the suspension element 215. In this case, a rear wall of the cavity 250 opposite the follower portion 210 has a length which corresponds to a third or a quarter of a length of the cavity 250 on the side of the cavity 250 adjoining the follower portion 210. The side walls of the cavity 250 run obliquely in the direction of the rear wall, whereby the cavity is designed in a trough-shaped manner. A spacing between the follower portion 210 and the rear wall of the cavity 250 opposite the follower portion 210 is increased by the evasive movement of the follower portion 210. The main body portion to which the second web 245 is connected is arranged between the cavity 250 and the second outer portion 235.

According to the exemplary embodiment shown here, the suspension element 215 is configured to cause a switching movement of the follower portion 210 in the direction of the fastening side 225, in response to an external force acting on a free end of the follower portion 210. According to the exemplary embodiment shown here, the follower portion 210 is pushed by the switching movement into the cavity 250. The switching movement may run substantially in the direction opposing the evasive movement. The external force may be caused, for example, by a foreign body entrapped between the protection device 120 and the counter body 125, as shown with reference to the following FIGS. 3 and 4.

According to the exemplary embodiment shown here, the protection device 120 additionally comprises a switching device 255. The switching device 255 has a first switching element 260 which is connected to the follower portion 210 and a second switching element 265 which is connected to the main body 205. The first switching element 260 represents a lengthening of the follower portion 210 protruding into the cavity 250. The second switching element 265 is arranged on the rear wall of the cavity 250 or is designed as a portion of the rear wall. In the relaxed state of the protection device 120 a gap is located between the switching elements 260, 265. The gap is increased by the evasive movement of the follower portion 210 and reduced by the switching movement of the follower portion 210.

The first switching element 260 is moved by the switching movement of the follower portion 210 in the direction of the second switching element 265, until the two switching elements 260, 265 are in contact with one another. The protection device 120 shown here may also be correspondingly denoted as an integrated anti-entrapment device or entrapment detector. In this case, the first switching element 260 and the second switching element 265 are formed by way of example from an electrically conductive material, for example an intrinsically conductive polymer. The switching device 255 in combination with the follower portion 210 may also be denoted as a detection system for detecting and identifying an entrapped foreign body. If an entrapped foreign body is detected by means of the follower portion 210 between the protection device 120 and the counter body 125, the entrapment forces are conducted to the switching device 255 by means of the switching movement. A contact between the first switching element 260 and the second switching element 265 is closed by the entrapment forces. This results in a power circuit being closed, which in turn may be detected by an evaluation unit.

Additionally or alternatively to the switching elements 260 shown, the switching device 255 may have other sensor elements in order to detect the switching movement of the follower portion 210, for example capacitively, inductively or optically.

According to an exemplary embodiment, the main body 205 also has at least one sealing portion 270 for sealing the door leaf relative to the counter body. According to the exemplary embodiment shown here, the main body has two sealing portions 270 which are designed in each case on the sealing side 220 of the main body 205 as an extension of the first outer portion 230 and of the second outer portion 235.

According to the exemplary embodiment shown here, the sealing portion 270 arranged on the first outer portion 230 is designed as a hollow and compressible sealing element 275.

In the relaxed state of the protection device 120, shown here, the sealing element 275 protrudes relative to the follower portion 210 in the x-direction. If, for closing the door and for sealing the door leaf, the protection device 120 is pressed against the counter body 125, in this case the further protection device, the sealing element 275 is compressed, as shown by means of the following FIGS. 3 and 4, whereby the follower portion 210 protrudes relative to the sealing element 275 in the x-direction.

The sealing element 275 is designed as a narrow U-shaped element which is connected to the main body 205 at one end and which has an approximately rectangular shape which tapers in the direction of the first outer portion 230.

According to the exemplary embodiment shown here, the sealing portion 270 which is arranged on the second outer portion 235 is designed as a solid impact element 280 with a sealing surface. The impact element 280 is similar in terms of its width to the width of the sealing element 275, but has only a fraction of the length of the sealing element 275, for example a quarter or a fifth of the length of the sealing element 275. In the relaxed state of the protection device 120, shown here, the follower portion 210 protrudes in the x-direction relative to the impact element 280.

Figure 6:
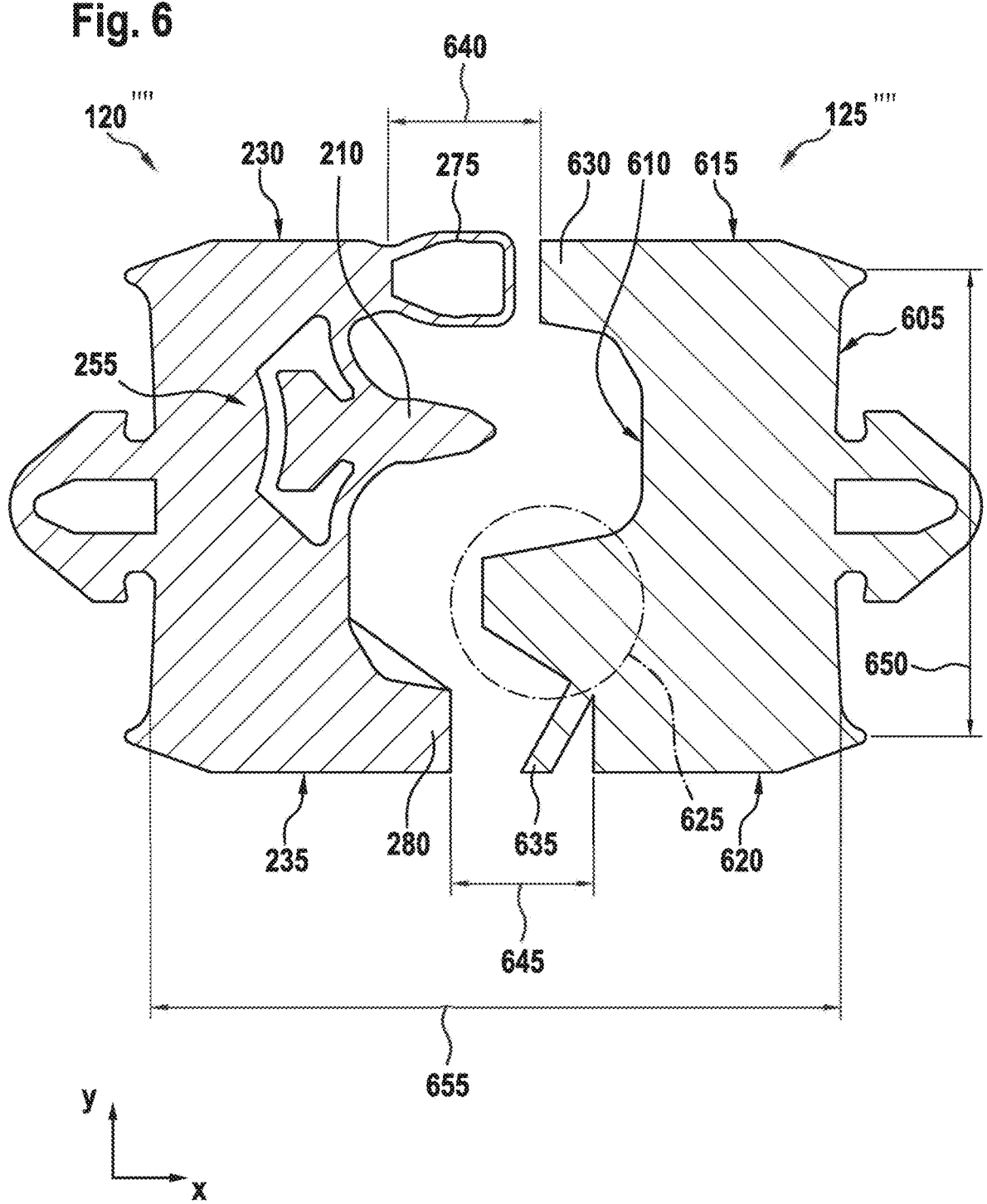
FIG. 6 shows a schematic view of a protection device and a counter body according to an exemplary embodiment.

As an alternative to the embodiments shown here, at least one of the sealing portions 270 may also be designed as a sealing lip, as is shown by way of example in FIG. 6.

In this case the counter body 125, as the further protection device, is designed identically to the protection device 120, with the exception that the counter body 125 does not comprise the switching device 255. The design of the main body 205, the follower portion 210 and the suspension element 215 corresponds, however, to the exemplary embodiment of the protection device 120 described herein. The further protection device is arranged so as to be rotated by 180 degrees relative to the protection device 120, so that the follower portions 210 oppose one another in an offset manner and in a closed state the first outer portion 230 of the protection device 120 bears against the second outer portion 235 of the counter body 125 and the second outer portion 235 of the protection device 120 bears against the first outer portion 230 of the counter body 125. As a result, in each case one of the sealing elements 275 opposes one of the impact elements 280. In the mounted state of the protection device 120 and of the counter body 125 on opposing door leaves, the sealing portions 270 are pressed against one another during a door closing procedure. In this case, one respective sealing element 275 is pressed against one respective impact element 280, in order to achieve a seal. In this case, the follower portions 210 are not in contact with the respectively opposing finger protection rubber, the protection device 120 and/or the counter body 125. This results in no entrapment forces, and thus no detection.

The protection device 120 shown here and the counter body 125 shown here are able to be used for a double-leaf door device as shown in FIG. 1. To this end, a front edge of each of the two door leaves may be provided with a finger protection rubber in the form of the protection device 120 or the further protection device. In this case at least one of the two door leaves has the protection device 120 with the switching device 255, which may also be denoted as an active finger protection rubber. The second door leaf may either have an active finger protection rubber or contain no detection system for identifying an entrapped foreign body, as in the case of the counter body 125, shown here, in the form of the further protection device without a switching device. This counter body 125 without a switching device 155 may also be denoted as a passive finger protection rubber.

In a single-leaf door system, one of the two finger protection rubbers, i.e. either the protection device 120 or the counter body 125, may be fastened to the vehicle portal, wherein the option exists in turn to provide both sides as active finger protection rubbers.

Figure 3:
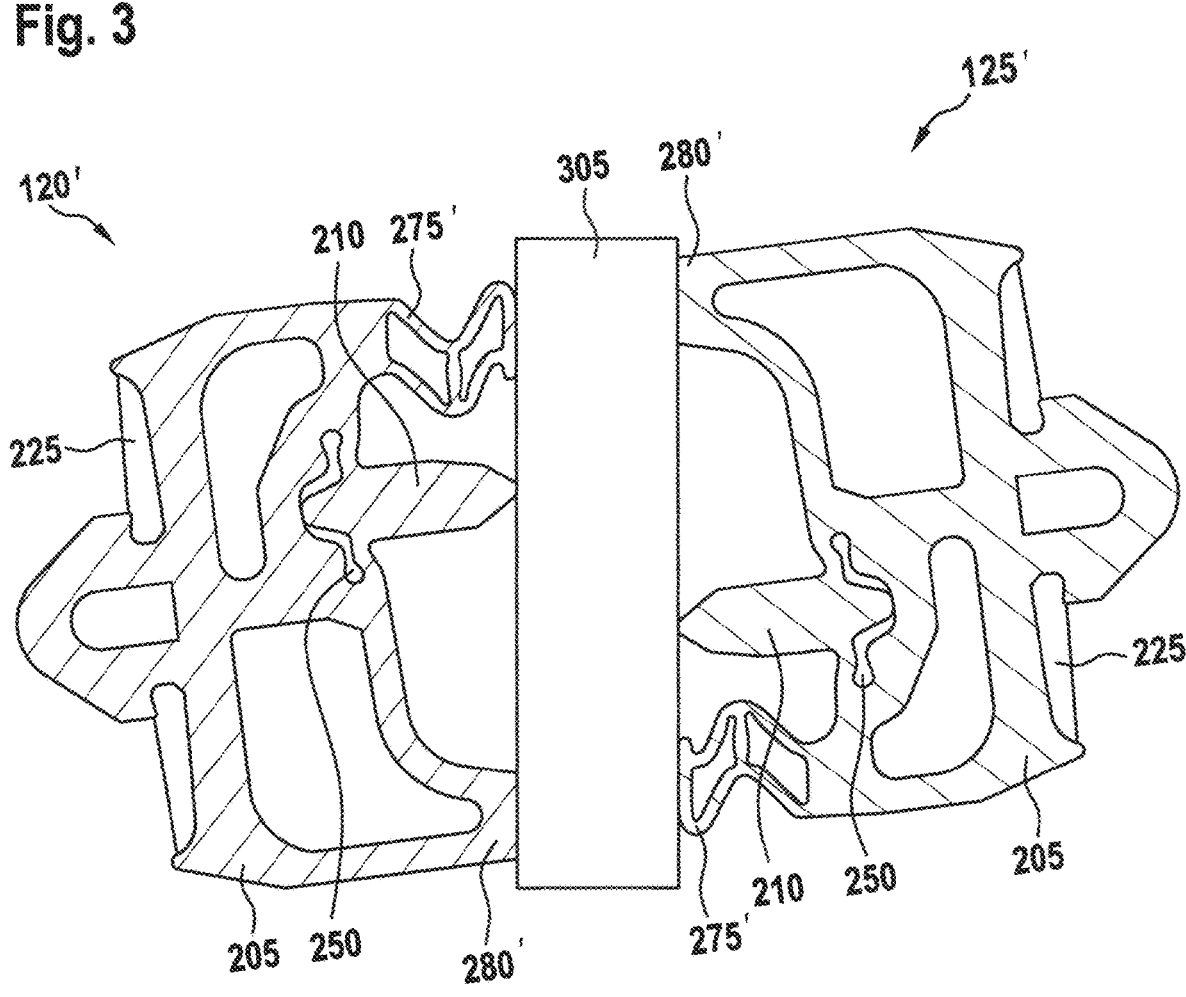
FIG. 3 shows a schematic view of a protection device and a counter body according to an exemplary embodiment.

FIG. 3 shows a schematic view of a protection device 120' and a counter body 125' according to an exemplary embodiment. The protection device 120' and the counter body 125', which is designed here as a further protection device, are similar to the exemplary embodiments described with reference to FIG. 2. A cross section of the protection device 120 and of the counter body 125 is shown during a closing procedure of the door. By way of example, a foreign body 305 is entrapped between the protection device 120 and the counter body 125'. The foreign body 305 prevents a contact between the sealing element 275' of the protection device 120' and the impact element 280' of the counter body 125, and between the impact element 280' of the protection device 120' and the sealing element 275' of the counter body 125'. Additionally, in each case the free ends of the follower portions 210 are in contact with the foreign body 305, whereby a detection of the foreign body 305 is enabled. If a sufficiently large foreign body 305 is located between the two finger protection rubbers, the protection device 120' and the counter body 125', during the closing procedure of the door leaves, a contact is made between at least one follower portion 210 and the foreign body 305 before the closed end position of the door leaves is reached. A portion of the closing force in this case is conducted into the follower portion 210, which results in a detection. In this case, the follower portion 210 is moved by means of the suspension element 215 in the direction of the fastening side 225.

By way of example, in addition to the cavity 250 and a recess designed in the fastening tab, two main body cavities are designed in the main body 205, the main body cavities running in each case over a large part of half of the length of the main body 205. In each case the sealing element 275 is designed here as a compressible U-shaped element with a central web between two cavities. The counter body 125' as a further protection device is also designed here identically to the protection device 120' and arranged so as to be rotated by 180 degrees relative to the protection device 120'.

Figure 4:
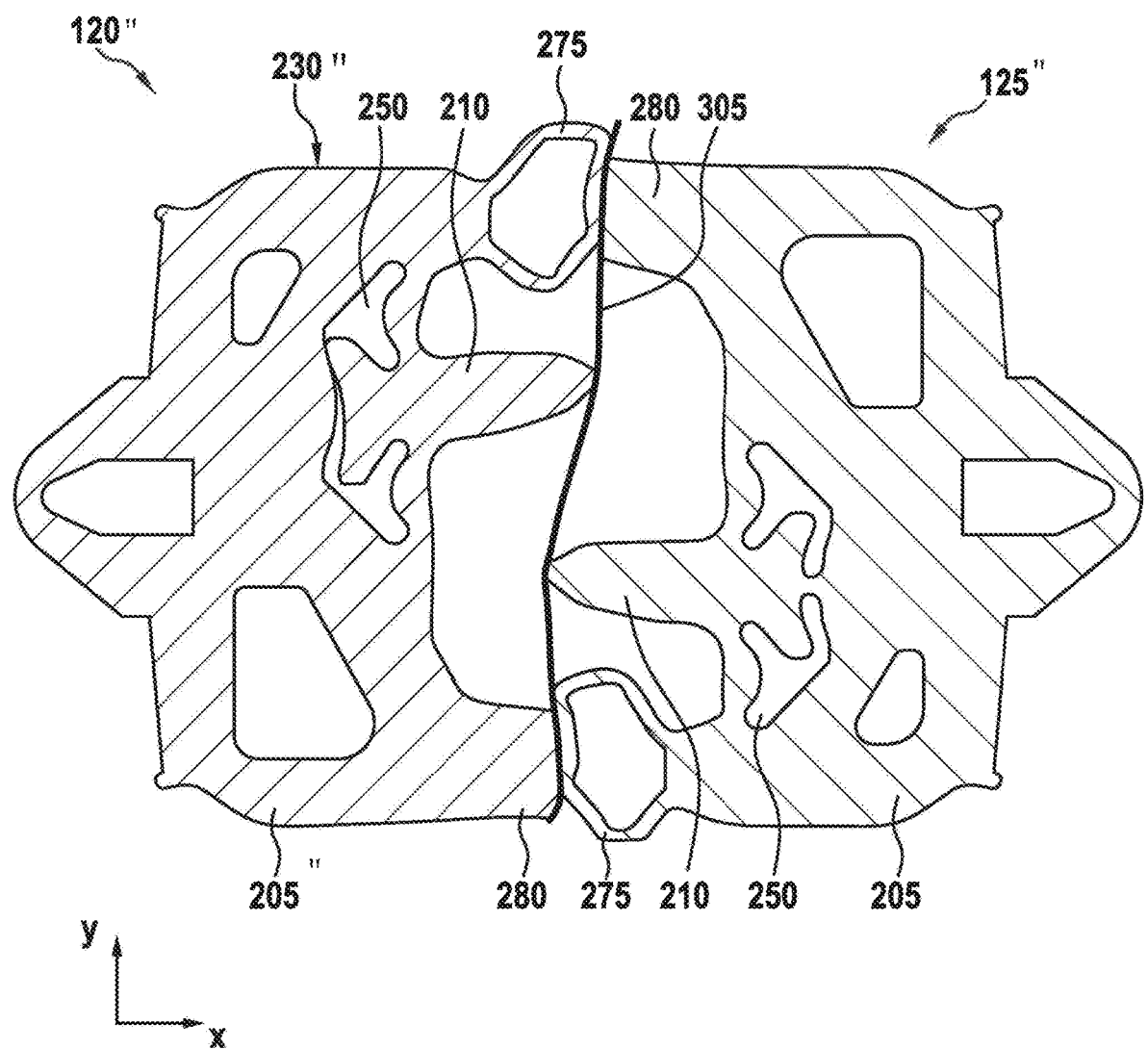
FIG. 4 shows a schematic view of a protection device and a counter body according to an exemplary embodiment.

FIG. 4 shows a schematic view of a protection device 120" and a counter body 125" according to an exemplary embodiment. Similar to FIG. 3, in this case a cross section is also shown through the protection device 120" and the counter body 125" in the form of a further protection device rotated by 180 degrees to the protection device 120". A state is shown of the protection device 120" and the counter body 125" which corresponds to a state when the door is closed, with the protection device 120" on a door leaf and the counter body 125" on a different door leaf or vehicle portal. This is shown by the deformation of the two sealing elements 275, which in each case are pressed against the opposing impact elements 280 and are compressed thereby. The main body cavities designed in the main bodies 205, 205" are designed in this case to be smaller than in the exemplary embodiment shown in FIG. 3.

As shown in FIG. 2, in this case the protection device 120, 120" has a switching device. The follower portion 210 of the counter body 125, 125" in this case does not have a switching device but is connected by means of a small connecting web to the rear wall of the cavity 250. The connecting web runs in the direction of extension of the follower portion 210. The foreign body 305 is designed in this case as a narrow object. If a narrow object, which is too small for a direct detection during the door closing procedure, such as for example an item of clothing or a narrow dog leash, is entrapped as a foreign body 305 between the protection device 120, 120" and the counter body 125, 125", the detection is carried out when an attempt is made to pull out this narrow foreign body 305 when the door is closed. In this case the follower portion 210 is moved slightly in the direction of the y-axis, as shown here by the position of the follower portions 210, which are inclined slightly in the direction of the first outer portion 230 of the protection device 120, 120". By the pulling-out movement a lateral force is introduced into the follower portion 210. This generates a rotation of the follower portion 210 which in turn closes a switch contact and thus triggers the detection.

Figure 5:
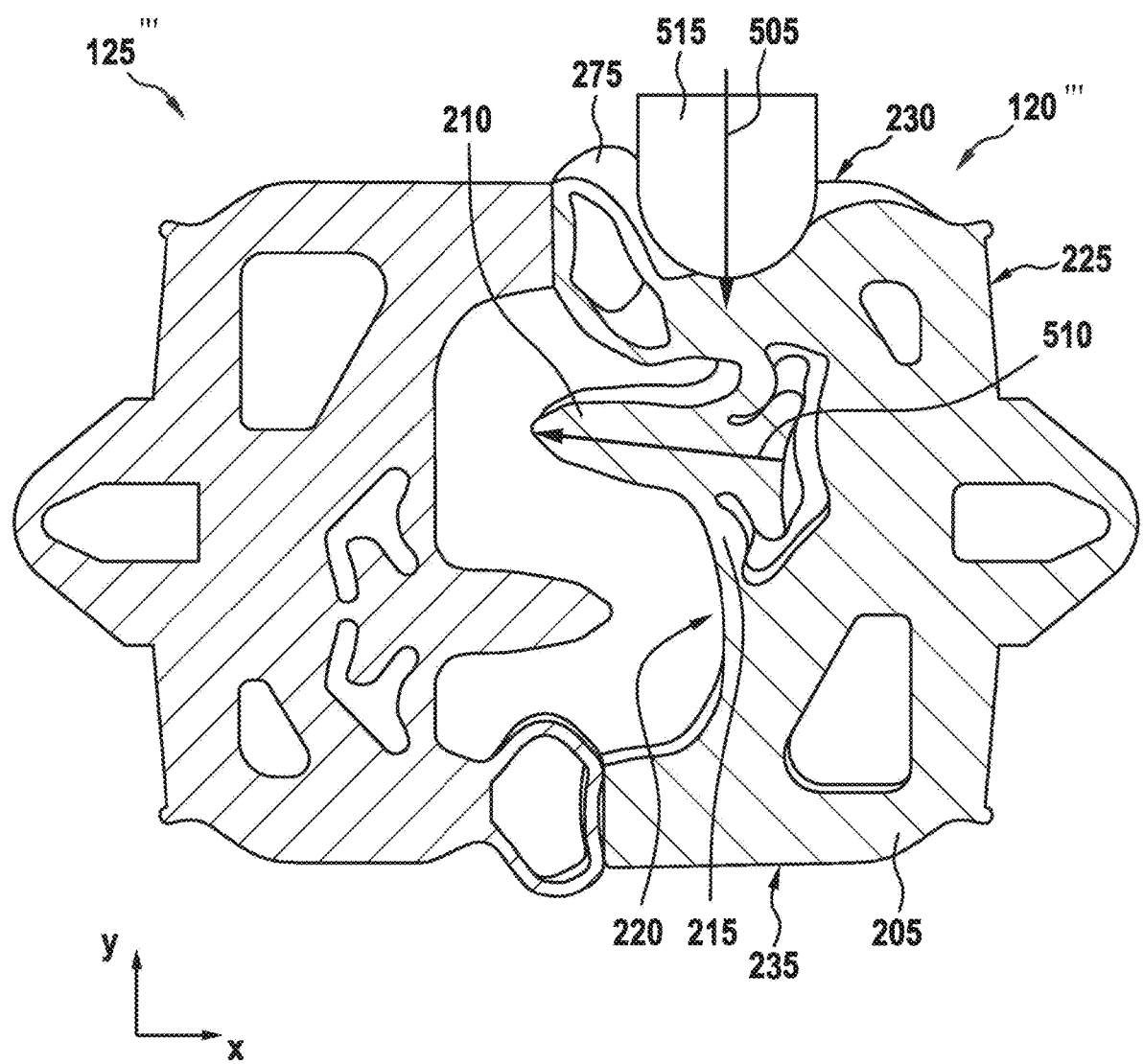
FIG. 5 shows a schematic view of a protection device and a counter body according to an exemplary embodiment.

FIG. 5 shows a schematic view of a protection device 120''' and a counter body 125''' according to an exemplary embodiment. A cross section is shown through the counter body 125''' and the protection device 120''' rotated by 180 degrees relative to the counter body 125'''. The design and embodiment of the protection device 120''' and the counter body correspond to the exemplary embodiment described with reference to FIG. 4, wherein the view shown here is mirror-inverted relative to FIG. 4. The counter body 125''' and the protection device 120''' are also shown here in the state pressed against one another, which corresponds to a closed door.

In the exemplary embodiment shown here, the evasive movement 510 of the follower portion 210 away from the fastening side 225 is caused by the application of force 505 on the first outer portion 230 of the protection device 120'''. The application of force 505 is oriented here in the direction of a y-axis, in this case by way of example it acts at right angles to the follower portion 210 on the protection device 120". The application of force 505 is caused by a foreign body 515 acting from outside on the protection device 120".

According to the exemplary embodiment shown here, the suspension element 215 is designed to deflect a compressive force, which is caused by the application of force 505, into a movement force acting in the direction of extension of the follower portion 210 in order to move the follower portion 210, thereby causing the evasive movement 510. The deflection is carried out mechanically by a deformation of the protection device 120''' shown here.

According to the exemplary embodiment shown here, the first outer portion 230 and the suspension element 215 are able to be deformed in response to the application of force 505. In this case, the first outer portion 230 is moved in the direction of the second outer portion 235 and the suspension element 215 is compressed in order to cause the evasive movement 510 of the follower portion 210. Here by way of example the first web of the suspension element 215 is compressed, whereby the follower portion 210 is pushed away from the fastening side. Further portions of the main body 205, for example in the region of the fastening side 225, and the second outer portion 235 and a region of the sealing side 220 between the follower portion 210 and the second outer portion 235 remain undeformed.

The sealing element 275 which is designed as an extension of the first outer portion 230 is also deformed at the same time, whereby a further portion of the compressive force caused by the application of force 505 is deflected. The "folding away" of the follower portion 210, shown here, when the foreign body 505 penetrates the protection device 120''' from the side when the door is closed, is designed to prevent an undesired detection of the foreign body 505, due to a contact of the switching device in the case of the switching movement of the follower portion 210. The undesired detection, i.e. a detection while a safety critical situation is not present, is advantageously not triggered here, although the foreign body 505 is pressed against the protection device 120''' from inside or outside the vehicle. This is advantageous for the trouble-free operation of a vehicle provided with the protection device 120'''. In this case, the deformation shown here of the first outer portion 230 and the suspension element 215 and the evasive movement 510 prevents the undesired detection. In this case, a detection is carried out, for example, only after the application of force 505 with a force of >60 N, for example, in the case of a foreign body 505 having a diameter of 10 mm. In the region of the sealing element 275 the trigger tolerance is lower, since depending on the tolerance position, i.e. depending on the pressing tolerance, a detection is carried out even with a smaller force and/or if a smaller object is pushed between the sealing element 275 and the opposing impact element 280.

FIG. 6 shows a schematic view of a protection device 120'''' and a counter body 125 according to an exemplary embodiment. The protection device 120'''' shown here is similar or corresponds to the protection device described with reference to the above figures. The counter body 125'''' shown here, however, is not designed as a further protection device but has a recess which is designed as an additional anti-penetration device of the foreign body acting from outside. A cross section is shown through the protection device 120'''' and the counter body 125'''', which in this case are not pressed against one another, and thus a state is shown, which is not fully closed, of a door device with the protection device 120'''' and the counter body 125''''.

The counter body 125'''', shown here, may be connected to the closing edge of one of the door leaves of the door device as described with reference to FIG. 1. According to the exemplary embodiment shown here, the counter body 125 has a counter body fastening side 605 for fastening the counter body 125'''' to one of the door leaves and a counter body sealing side 610 which opposes the fastening side and which faces the protection device 120''''. Moreover, the counter body 125'''' comprises a first counter body outer portion 615 and a second counter body outer portion 620. The first counter body outer portion 615 and the second counter body outer portion 620 run between the counter body sealing side 610 and the counter body fastening side 605. An anti-penetration portion 625 is arranged between the first counter body outer portion 615 and the second counter body outer portion 620. The anti-penetration portion 625 is designed to fill partially an intermediate space between the follower portion 210 and the second outer portion 235 of the protection device 120''''. The anti-penetration portion 625 is provided instead of a follower portion.

The anti-penetration portion 625 adjoins the second counter body outer portion 620 and partially runs along the counter body sealing side 610, here by way of example over a third of the length of the counter body sealing side 610. The anti-penetration portion 625 is chamfered in the direction of the counter body outer portion 620. Additionally, the anti-penetration portion 625 has a flat free end. The anti-penetration portion 625 is configured to prevent a penetration of a foreign body from outside between the protection device 120 and the counter body 125''''.

In the protection device 120'''', the switching device 255 is implemented by the follower portion 210, and in the mounted state the anti-penetration portion 625 is arranged obliquely opposite on the counter body sealing side 610. In the closed state of the door device when the protection device 120 and the counter body 125'''' are pressed against one another, a penetration is prevented by means of the anti-penetration portion 625 at least on one side. In this manner the penetration of the foreign body from the inner side or from the outer side of the vehicle is impeded or prevented, which eliminates an undesired detection of the foreign body.

According to the exemplary embodiment shown here, for sealing the counter body 125'''' relative to the protection device 120'''' the protection device 120'''' has the sealing element 275 as an extension of the first outer portion 230 and the impact element 280 as an extension of the second outer portion 235. The counter body 125'''' has a counter body impact element 630 as an extension of the first counter body outer portion 615 and a counter body sealing lip 635 as an extension of the second counter body outer portion 620. The sealing lip 635 has an end connected to the anti-penetration portion 625 and a free end, and protrudes obliquely from the counter body sealing side 610. The sealing lip 635 shown here may also be implemented additionally or alternatively to the sealing element 275 and the impact element 280 on the part of the protection device.

According to one embodiment, in the closed state of the door device, i.e. when the protection device 120'''' and the counter body 125'''' are pressed against one another, a first spacing 640 between the first outer portion 230 and the first counter body outer portion 615 is greater than a second spacing 645 between the second outer portion 235 and the second counter body outer portion 620. This is advantageous in order to keep an actuating force of the switching device 255 low for identifying the foreign body which is entrapped or being dragged along. The purpose thereof is for the foreign body, for example an item of clothing, to be clamped from one side in the region 645, for example, from the inside of the vehicle. If the foreign body is then pulled from the inside of the vehicle, the switching movement of the follower portion 210 does not take place or only in the case of very high force. In this case the protection device 120'''' and the counter body 125'''' are designed such that the forces for causing the switching movement of the follower portion 210 and thus for identifying the foreign body may be of different sizes on the inner side of the vehicle and on the outer side of the vehicle, for example 150 newtons on the outer side in order to trigger more rapidly the identification of the foreign body on a side which is safety-critical in terms of the foreign body being dragged along, for example the outer side.

The counter body 125, 125', 125'', 125''', 125'''' and the protection device 120, 120', 120'', 120''', 120'''' by way of example have in each case a width 650 of approximately 32 millimeters and a common length 655 of approximately 44 millimeters (nominally 40 millimeters+/−2.5 millimeters).

If an exemplary embodiment encompasses an "and/or" conjunction between a first feature and a second feature, this is to be interpreted to mean that the exemplary embodiment has according to one embodiment both the first feature and the second feature and according to a further embodiment either only the first feature or only the second feature.

LIST OF REFERENCE NUMERALS

100 Vehicle
105 Door device
107 Door
110 Door leaf
115 Further door leaf
120, 120', 120", 120''', 120'''' Protection device
125, 125', 125", 125''', 125'''' Counter body
205, 205" Main body
210 Follower portion
215 Suspension element
220 Sealing side
225 Fastening side
230, 230" First outer portion
235 Second outer portion
240 First web
245 Second web
250 Cavity
255 Switching device
260 First switching element
265 Second switching element
270 Sealing portion
275, 275' Sealing element
280, 280' Impact element
305 Entrapped foreign body
505 Application of force
510 Evasive movement
515 Externally acting foreign body
605 Counter body fastening side
610 Counter body sealing side
615 First counter body outer portion
620 Second counter body outer portion
625 Anti-penetration portion
630 Counter body impact element
635 Sealing lip
640 First spacing
645 Second spacing
650 Width
655 Length

The invention claimed is:

1. A protection device for a door leaf for a vehicle, the protection device comprising:
a main body which has a fastening side for fastening the main body to the door leaf and a sealing side opposite the fastening side in an x-axis direction, and a first outer portion of the main body and a second outer portion of the main body, wherein the first outer portion and the second outer portion run between the sealing side and the fastening side and extend from the fastening side to the sealing side in the x-axis direction;
a follower portion arranged on the sealing side;
a switching device, wherein the switching device has a first switching element connected to the follower portion and a second switching element connected to the main body, wherein the first switching element and the second switching element are brought into contact by a switching movement of the follower portion toward the fastening side, and
a suspension element which movably connects the follower portion to the main body and is configured to cause an evasive movement of a tapered free end of the follower portion away from the fastening side in response to an application of force in a direction perpendicular to the first outer portion of the main body, the suspension element and the follower portion forming one side of an enclosed cavity, the one side is disposed opposite the fastening side, the cavity containing the first switching element connected to the follower portion and the second switching element connected to the main body,
wherein the suspension element is configured to deflect a compressive force caused by the application of the force in the perpendicular direction into a movement force causing the evasive movement of the tapered free end of the follower portion away from the fastening side,
wherein the suspension element has a first web interconnecting a side of the follower portion to the first outer portion and a second web interconnecting an opposing side of the follower portion to the second outer portion,
a hollow compressible sealing element extending from the first outer portion in the x-axis direction and a solid impact element with a sealing surface extending from the second outer portion in the x-axis direction, and
wherein, in a relaxed state, the hollow compressible sealing element protrudes further in the x-axis direction than the follower portion, and the follower portion protrudes further in the x-axis direction than the solid impact element and is disposed between the hollow sealing element and the solid impact element.

2. The protection device of claim 1, wherein the first outer portion and the suspension element are deformable in response to the application of the force in the perpendicular direction, wherein the first outer portion is moved in the direction of the second outer portion and the suspension element is compressed to cause the evasive movement of the follower portion.

3. The protection device of claim 1, wherein one of the first web or the second web has a curvature, wherein an end of one of the first web or the second web connected to the follower portion is further removed from the fastening side than an end of the one of the first web or of the second web connected to the main body.

4. The protection device of claim 1, wherein a spacing between the follower portion and a rear wall of the cavity opposite the follower portion is increased by the evasive movement of the follower portion.

5. The protection device of claim 1, wherein the follower portion is configured to move toward the fastening side in response to an external force acting on the free end of the follower portion.

6. A door system, comprising the door leaf and the protection device of claim 1, wherein the protection device is connected to a closing edge of the door leaf.

7. The door system of claim 6, wherein the door system has a further door leaf comprising a further protection device which is connected to a closing edge of the further door leaf.

8. The door system of claim 6, wherein the door system has a further door leaf and a further protection device which is connected to a closing edge of the further door leaf, the further protection device comprising a counter body which has a counter body sealing side which faces the protection device and a counter body fastening side for fastening the counter body to the further door leaf, and the counter body comprises a first counter body outer portion and a second counter body outer portion, wherein the first counter body outer portion and the second counter body outer portion run between the counter body sealing side and the counter body fastening side, wherein an anti-penetration portion is arranged between the first counter body outer portion and the second counter body outer portion and is configured to partially fill an intermediate space between the follower portion and the second outer portion of the protection device when the door leaf and the further door leaf are closed.

9. The door system of claim 8, wherein when the door leaf and the further door leaf are closed, a first spacing between the first outer portion and the first counter body outer portion is greater than a second spacing between the second outer portion and the second counter body outer portion.

* * * * *